A. M. BROWN.
Self-Feeding Water-Trough.
No. 209,378. Patented Oct. 29, 1878.
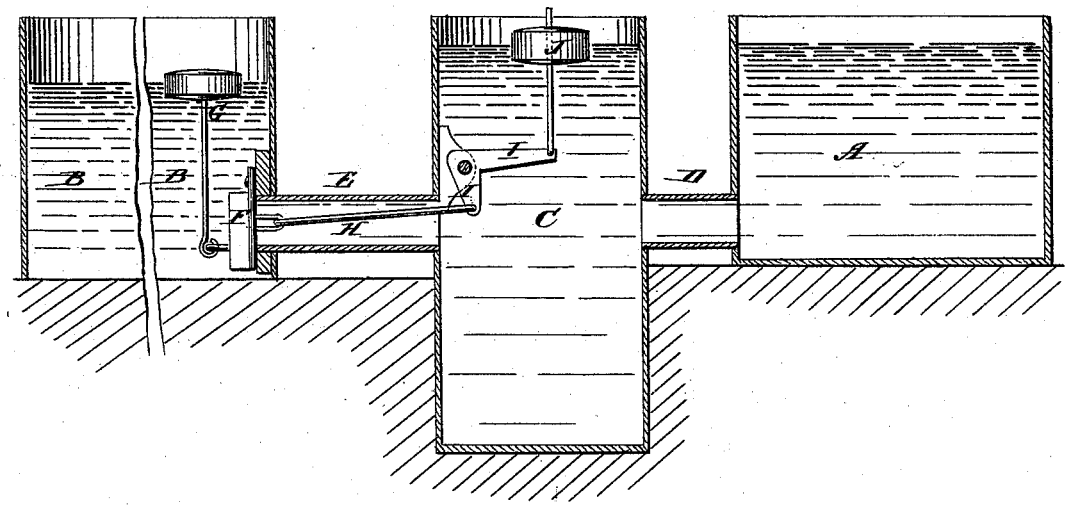
WITNESSES:
Francis McArdle
C. Sedgwick
INVENTOR:
A. M. Brown
BY Munn & Co
ATTORNEYS.

UNITED STATES PATENT OFFICE.

ALVIN M. BROWN, OF NETTLETON, MISSOURI, ASSIGNOR TO HIMSELF AND DANIEL S. KING, OF SAME PLACE.

IMPROVEMENT IN SELF-FEEDING WATER-TROUGHS.

Specification forming part of Letters Patent No. 209,378, dated October 29, 1878; application filed May 25, 1878.

*To all whom it may concern:*

Be it known that I, ALVIN MASON BROWN, of Nettleton, in the county of Caldwell and State of Missouri, have invented a new and useful Improvement in Self-Feeding Water-Trough, of which the following is a specification:

The figure is a vertical section of my improved apparatus.

The object of this invention is to furnish an improved apparatus which shall be so constructed as to keep a trough or tank supplied with water automatically for watering cattle, railway uses, and other purposes, and which at the same time shall be simple in construction and not liable to get out of order.

The invention consists in the combination of the reservoir, the two connecting-pipes, the two floats, the valve, the connecting-rod, and the elbow-lever with each other, and with a pond or reservoir and the trough or tank, as hereinafter fully described.

A represents the trough or tank which is to be supplied with water. B is a pond or reservoir, natural or artificial, from which the water is obtained to supply the trough A. Between the trough A and the pond B is placed a reservoir or tank, C, which is connected with a trough, A, by a pipe, D, and with the pond or reservoir B by a pipe, E, as shown in the figure.

The end of the pipe E which opens into the pond or reservoir B is supplied with a valve, F, with which is connected a float, G, of such buoyancy as to open the valve F when released and allow the water to flow through the pipe E into the reservoir C.

To the valve F is attached one end of a rod, H, which passes longitudinally through the pipe E, and is connected at its other end with the end of the short arm of the bent lever I.

The bent lever I is pivoted at its angle a little above the mouth of the pipe E to supports attached to the side of the reservoir C.

With the long arm of the lever I is connected a float, J, of sufficient buoyancy to operate the bent lever I and close the valve F when the water rises in the reservoir C.

The water in the trough A and reservoir C stands at the same height, the communication through the pipe D being unimpeded.

With this construction, as water is removed from the trough A it also lowers in the reservoir C and allows the float J to descend, so that the float G may open the valve F and allow water to flow through the pipe E into the reservoir C to replace the water that was taken from the trough A. As the water again rises in the trough A and reservoir C the float J is again raised, which closes the valve F and prevents any more water from escaping from the pond B, so that the water in the trough A will always be kept at about the same height however rapidly or slowly it may be taken from the said trough.

The valve F should be covered with a screen to protect it from any substance that might prevent it from closing and shutting off the water.

Having thus described my invention, I claim as new and desire to secure by Letters Patent—

The combination of the reservoir C, the two connecting-pipes D E, the two floats J G, the valve F, the connecting-rod H, and the elbow-lever I with each other, and with the pond or reservoir B and the trough or tank A, substantially as herein shown and described.

ALVIN MASON BROWN.

Witnesses:
FRANCIS M. BARLOW,
CHARLES C. BURGESS.